United States Patent [19]
Habegger

[11] Patent Number: 5,513,860
[45] Date of Patent: May 7, 1996

[54] ARRANGEMENT FOR CLAMPING A BAR OF MATERIAL

[76] Inventor: Harold Habegger, Sous-Graitery 10, CH-2738 Court, Switzerland

[21] Appl. No.: 986,870

[22] Filed: Dec. 7, 1992

[30] Foreign Application Priority Data

Dec. 10, 1931 [FR] France ................................. 91 15415

[51] Int. Cl.$^6$ ............................ B23B 31/16; B23B 31/30
[52] U.S. Cl. ....................... 279/4.04; 279/4.12; 279/121
[58] Field of Search ................................. 279/4.12, 4.04, 279/75, 121, 4.1

[56] References Cited

U.S. PATENT DOCUMENTS

| | | | |
|---|---|---|---|
| 1,099,724 | 6/1914 | Schlachter | 279/75 X |
| 1,181,844 | 5/1916 | Church | 279/121 |
| 4,349,207 | 9/1982 | Fink | 279/4.12 |

FOREIGN PATENT DOCUMENTS

3802982  8/1989  Germany .

*Primary Examiner*—Steven C. Bishop

[57] ABSTRACT

The invention concerns an arrangement for clamping a bar of material. Such arrangement includes: clamping jaws (MS, MS') guided in a radial direction relative to the bar and adapted to take up two distinctive radial positions referred to as closed and open in order to clamp and to release the bar (B), a jaw closing mechanism (MF, MF') adapted so as to provide the jaws with a grasping force intended to assure clamping of the bar (B), return means (MR) for urging the jaws towards their open position and to assure release of said bar (B), and control means (MP) capable of controlling the operation of the closing mechanism (MF, MF') and the operation of the return means (MR) by a motion of translation substantially coaxial to the bar (B) in order to control respectively the closing and opening of the jaws, such control means (MP) being freely mounted for rotation relative to the closing mechanism (MF, MF'), while such mechanism (ME, MF') is entirely subjected to the rotational motion of said jaws (MS). This arrangement is intended to fit out the headstock of a machining lathe, for example of the automatic type.

13 Claims, 6 Drawing Sheets

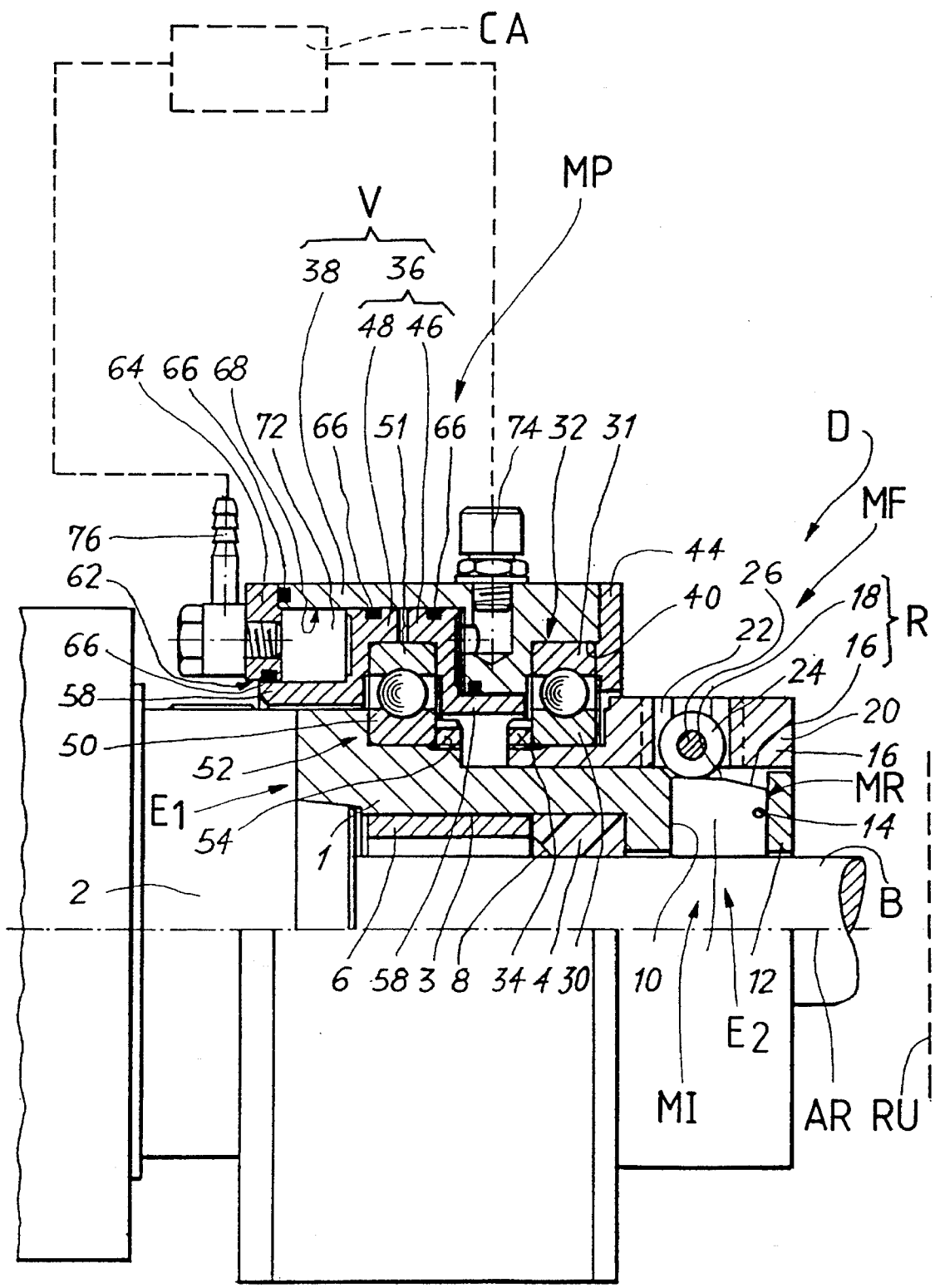

ARRANGEMENT FOR CLAMPING A BAR OF MATERIAL

The invention concerns a clamping arrangement for a bar of material.

More specifically, it concerns a clamping arrangement for a bar, especially intended to fit out a machine tool such as a machining lathe, for example of the automatic type, enabling longitudinal turning, that is to say, machining through the displacement of one or several working tools along the longitudinal axis of the bar.

BACKGROUND OF THE INVENTION

In this type of machine, one seeks to have the tools working with a maximum chip removal which induces extremely high cutting efforts. The bar to be machined must thus be very strongly clamped at the headstock of the lathe.

In order to provide such efforts, standard arrangements have been conceived so as to be very voluminous with a space requirement and inertia detrimental to their operation. Additionally, such arrangements generally exhibit a tendency to rapid wear.

Thus, the present invention has as purpose to provide a clamping arrangement which is of simple construction, compact and sturdy.

SUMMARY OF THE INVENTION

To this end, the invention has as objective a clamping arrangement for a bar of material characterized in that it includes clamping means including movable jaws guided in a radial direction relative to the bar of material, such jaws being capable of occupying at least two distinct radial positions referred to as closed and open in order respectively to clamp and release said bar, a mechanism for closing said jaws adapted to provide said jaws with a grasping force intended to assure clamping of said bar, return means intended to urge said jaws towards their open position and to assure release of said bar in the absence of force provided by the closing mechanism, and, control means capable of controlling the operation of the closing mechanism and the operation of the return means by a translation motion substantially coaxial to the bar in order to control respectively the closing and opening of the jaws, such control means being freely mounted for rotation relative to said closing mechanism, while such mechanism is wholly subjected to the rotational motion of said jaws.

Furthermore, the closing mechanism is coupled to the control means through rotational guidance means such as a first rotation bearing.

It will also be specified that the control means are made up from an actuator of the pneumatically controlled type provided with a piston and a cylinder, said cylinder, which is adapted to slide axially to the bar, being coupled to said closing mechanism while the piston is held fixed in translation.

Additionally, the piston is freely mounted for rotation relative to said jaws through a rotational guidance means such as a second rotation bearing.

According to still another aspect of the invention, the piston is made up from two end flanges mounted on either side of the second rotation bearing which specifically is of the type having a row of balls, such bearing being engaged and axially maintained on a cylindrical body in which are housed said jaws.

But other characteristics and advantages of the invention will better appear upon reading the detailed description which follows taken with reference to the attached drawings which are given by way of example.

BRIEF DESCRIPTION OF THE DRAWINGS

FIGS. 1 and 2 show a half cut-away longitudinal elevation of a clamping arrangement according to a first embodiment of the invention respectively in the released and clamped positions of a bar of material to be machined;

DESCRIPTION OF THE PREFERRED EMBODIMENTS

Figure 1:
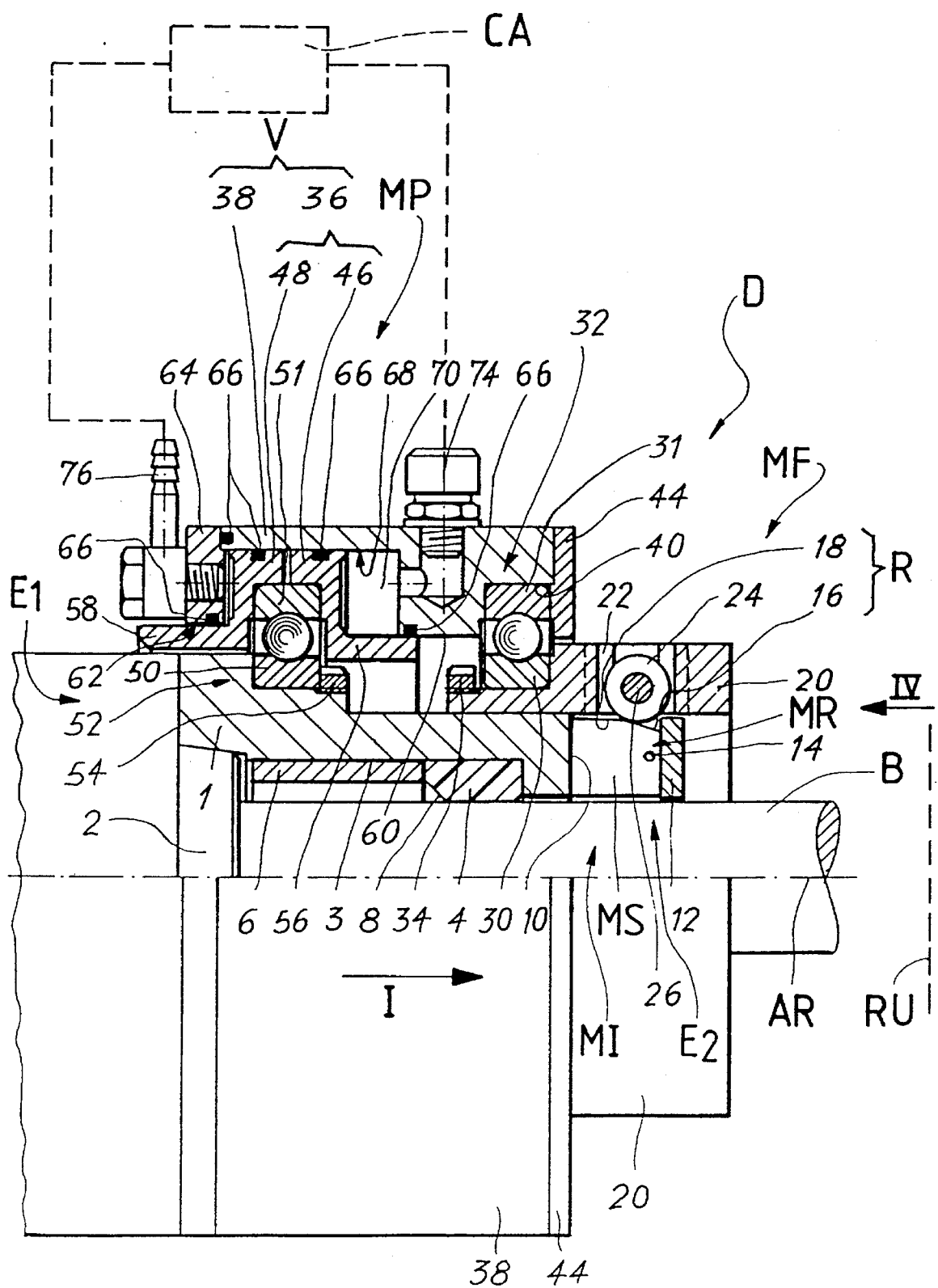
Figure 4:
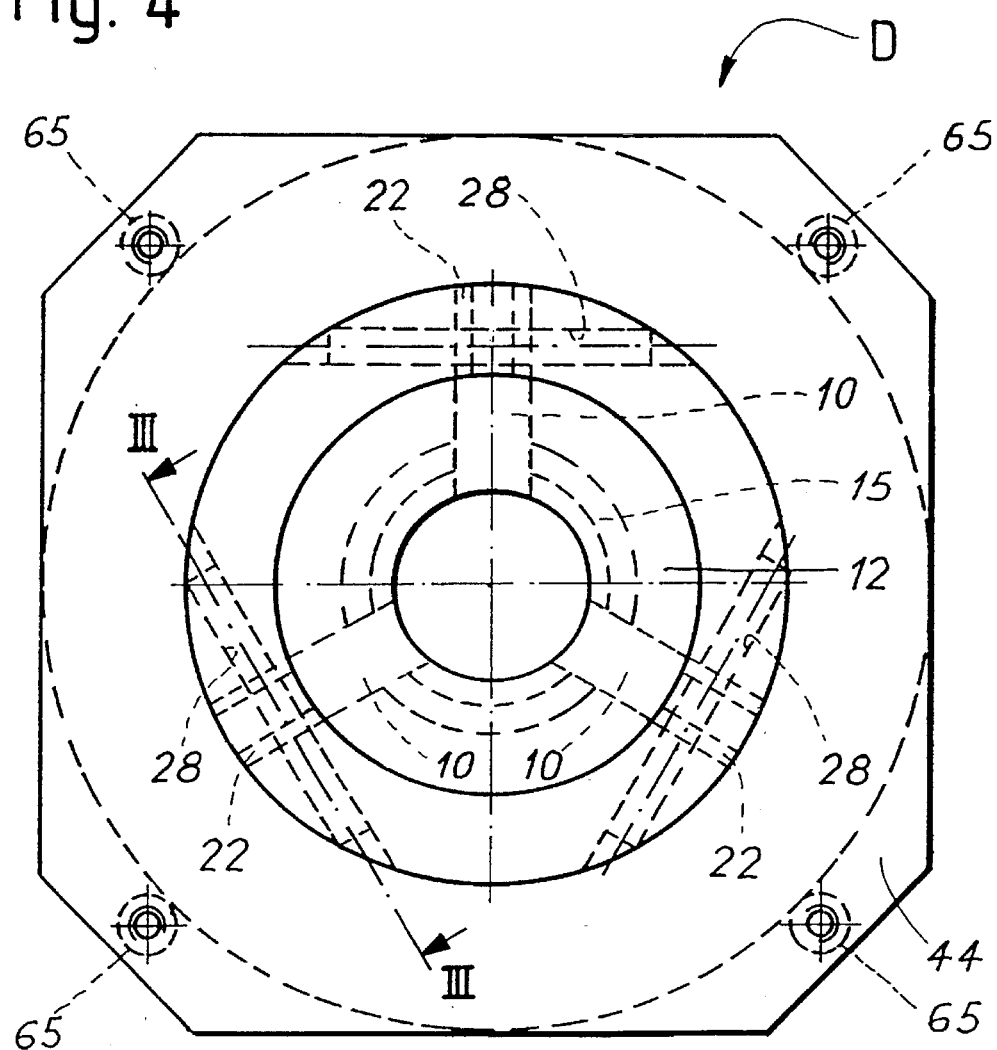
FIG. 4 is a face view of the arrangement of FIGS. 1 and 2 taken along arrow IV of FIG. 1, but showing only certain elements of the invention necessary for understanding thereof.
Figure 3:
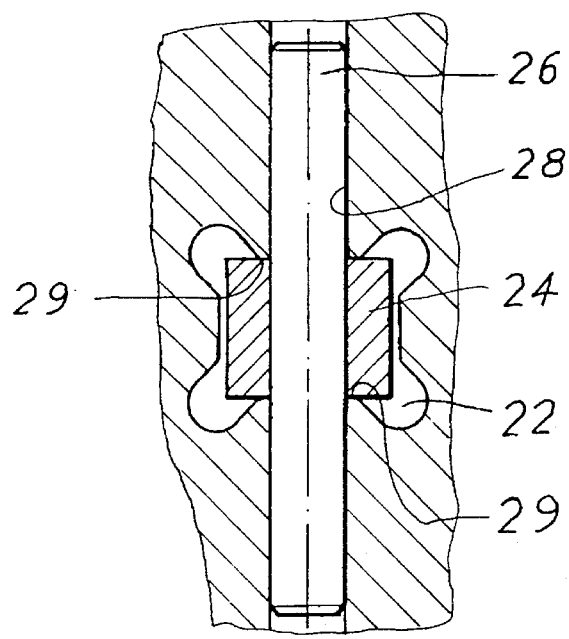
FIG. 3 is a partial longitudinal cross-section according to arrows III—III of FIG. 4 and showing a runner provided with its axle within a housing of a closing mechanism of the arrangement of FIGS. 1 and 2.

Referring now to FIGS. 1 to 4, there will be described hereinafter a first embodiment of the arrangement according to the invention, such arrangement being designated on the figures by the general reference D.

Arrangement D includes a cylindrical body 1 which is of basically tubular form and which is mounted in a standard manner by one end E1 referred to as the back end on a corresponding end of a headstock 2 of a machining lathe, for example of the automatic type, here not shown.

Within the tubular cylindrical body 1, and more specifically a cavity 3 provided in the latter, is housed an annular guide ring 4 which is formed of plastic material such as acetate resin and which is intended to receive for machining a bar of material referenced B in its interior and to guide it in radial direction. The guidance ring 4 is axially maintained in body 1 in being laterally supported on the one hand against the bottom of cavity 3 and on the other hand, in this first embodiment, against a tubular sleeve 6 force fitted in said cavity.

Guidance ring 4 includes an entry chamfer 8 enabling introduction of the bar of material B into the clamping jaws MS which will be described in detail hereinafter. Here it will be noted that the guidance ring 4 has initially as function to avoid metal-to-metal contact between bar B and the metallic elements of the arrangement D such as body 1 during introduction of such bar into the arrangement D (in the direction of introduction shown by arrow I) and secondly to center such bar relative to a rotation axis AR of the headstock 2 which axis in normal position is the same as the longitudinal geometrical axis of bar B.

The tubular cylindrical body 1 includes at the end several radial slots 10 (in this example three thereof) which are provided in a free end E2 of body 1, referred to as the forward end, and which open out in a radial direction (FIG. 4) towards the interior facing bar S and towards the exterior facing a closing mechanism MF. Such radial slots 10 are axially closed by an annular plate 12 secured on body 1 by screws, not shown.

The clamping jaws MS (three in this example) are respectively engaged in slots 10 and are guided in the radial direction in such slots in order to be displaced relative to bar B.

The clamping jaws MS which form gripping means MI for bar B are thus movable in body 1 and may occupy two distinct radial positions relative to such bar. Such positions which are referred to as the open and closed positions are respectively shown on FIGS. 1 and 2 for the first embodiment of the arrangement according to the invention, and on FIGS. 5 and 6 for the second embodiment.

It will be understood hereinafter that the open position of the clamping jaws MS corresponds to their relaxed state while the closed position of such jaws corresponds to their stressed state.

To this end, the arrangement D according to the invention includes return means MR made up by a wire spring 14 of toroidal form (FIG. 7) and open, such wire spring 14 laterally traversing the three jaws MS while it is arranged in a coaxial manner to axis AR. The wire spring 14 is furthermore engaged in a circular groove 15 provided at the end in body 1 neighbouring its free end E2 and closed by annular plate 12. Jaws MS are thus automatically brought into their open position in the absence of exterior stress.

Jaws MS each show an interior face, not referenced, arranged facing bar B, such face exhibiting a partially cylindrical form shaped so as to engage the outer periphery of bar B. Thus, in closed position (FIGS. 2 and 6), the jaws may clamp bar B very strongly in order to drive it in rotation in a manner concomitant with the angular displacement of headstock 2 against the cutting action of the machining tool or tools, not shown.

For this, the arrangement according to the invention includes a jaw closing mechanism MF which mechanism, as will be understood hereinafter, additionally offers a multiplication function of the force enabling control of the closing of the jaws, such effort being provided by control means MP.

Jaws MS each exhibit furthermore an outer face (not referenced) which is opposite the aforementioned interior face and which is arranged facing the closing mechanism MF and on which is provided a ramp R. In the case of the first embodiment such as here described, ramp R is a progressive ramp since it is stepped and includes two contiguous sections with different inclinations.

In taking as references the respective ends E1 (entry of bar B) and E2 (exit of said bar) as "back" and "forward", it will be noted that the forward section 16 of ramp R is more inclined than the back section 18 contiguous thereto.

Ramp R is said to have a negative inclination since sections 16 and 18 which form it run towards bar B (and towards the central axis AR) in the direction back to front (back towards the front) of the arrangement.

The closing mechanism MF includes a sleeve or pressure ring 20 which surrounds jaws MS, as well as the free end E2 of body 1. Pressure ring 20 may slide in the axial direction directly on the outer periphery of body 1 and specifically on its free end E2. Ring 20 exhibits radial openings 22 (here to the number of three) opening out towards the interior of the arrangement substantially facing slots 10 and jaws MS.

Within such radial openings 22 which have, as seen from above (FIG. 3), a trefoil form so as to disengage their corners are housed presser runners 24 of tubular cylindrical form mounted to be free in rotation through pins 26 engaged therein. Pins 26 are engaged and held (for example by screws not shown) respectively within bores 28 (FIGS. 3 and 4) which are provided and oriented along geometric chords within the pressure ring 20. The runners 24, which in this embodiment are coupled to ring 20, may be displaced and in particular roll along a direction parallel to axis AR.

Each runner 24 is laterally guided by two lateral faces 29 provided in each of the radial openings 22. Runners 24 directly and respectively contact ramps R and penetrate substantially into slots 10. Thus, ring 20 and runners 24 (that is to say, the entire closing mechanism MF) are coupled in rotation to body 1 and to jaw MS and such elements may be displaced together in rotation with headstock 2 and with bar B when the latter is clamped.

On the back of pressure ring 20 there is engaged an interior race 30 of a first rotational guidance means, here formed by a standard rotation bearing having a row of balls 32. The interior race 30 in this embodiment is freely mounted on a rear surface, not referenced, of pressure ring 20 and its axial displacement (play) is limited by a first slotted nut 34 screwed onto said ring 20.

The arrangement according to the invention further includes control means MP which, as will be understood, are adapted to control operation of the closing mechanism MF as well as the operation of the return means MR by a translation motion parallel to and substantially centered on axis AR, such movement thus being substantially coaxial to bar B.

The control means MP are made up from an actuator V of the double action pneumatically controlled type, such thrustor being provided with a piston 36 and a cylinder 38.

Within cylinder 38 and specifically in its forward portion situated at the side of the closing mechanism MF is provided a first cavity 40 in which is housed an outer race 31 belonging to rotation bearing 32. Such race 31 is maintained fixed in cavity 40 by a closing plate 44 referred to as the forward closing plate fixedly mounted on cylinder 38 around and at a slight distance from the pressure ring 20.

Piston 36 is made up from two end flanges respectively the forward flange 46 and rear flange 48 which are assembled on either side of a second rotational guidance means 52, also formed by a standard rotation bearing having one row of balls (same reference), and which are applied laterally against such bearing 52.

The second bearing 52 includes an interior race 50 which is engaged and axially maintained on the cylindrical body 1 (on a shouldered support riot referenced provided on a rear portion of tile latter) through a second slotted nut 54 screwed on body 1. The second bearing 52 includes an outer race 51 on which are freely engaged flanges 46 and 48.

To this end, flanges 46 and 48 respectively include cavities (not referenced) facing one another and in which a portion of the outer race 51 is housed. Flanges 46 and 48 respectively include cylindrical tubular surfaces 56 and 58 which extend from bearing 52 on either side of the latter.

Surface 56 extends towards the front of arrangement D and it is engaged by a sliding fit in a bore 60 provided in cylinder 38 behind the first bearing 32.

Furthermore, the surface 58 extends towards the rear of the arrangement D and is engaged by a sliding fit in a second bore 62 provided in a second closing plate 64 referred to as the rear closing plate, the closest (relative to the first plate 44) to the headstock 2. Cylinder 38 of actuator V is thus basically guided in translation by its sliding fit on the supports 56 and 58.

The rear closing plate 64 is held fixed to the cylinder 38 thanks to standard screw-nut assemblies 65 (FIG. 4) arranged on the exterior of cylinder 38 and engaged in the forward closing plate 44.

Between bore 62 and surface 58 as well as between bore 60 and surface 56 are placed seals, for example O-rings bearing a common reference 66. Another seal of the same type (same reference) is housed at the end in cylinder 38 and bears axially on the rear closing plate 64.

The two flanges 46 and 48 are furthermore engaged and may axially slide in a second cavity 68 forming a sleeve provided in cylinder 38 in a manner adjacent bore 60.

Within such cavity 68 and on either side of piston 36 formed by the two flanges 46 and 48 are formed two annular chambers respectively 70 (FIG. 1) and 72 (FIG. 2) referred to respectively as the pushing and pulling chamber.

Into chambers 70 and 72 open out ducts for air under pressure, respectively 74 and 76 which each permit admission or exhaust of air under pressure in an alternate fashion in order to actuate the thrustor V. Such ducts are fed by a pressurized air circuit CA here shown in a very sketchy manner. It will be noted that cylinder 38 is held fixed against rotation (relative to the lathe framework, not shown) solely by the air circuit CA and in particular by the flexible ducts also not shown, or possibly in an embodiment not shown by an ordinary system of guidance in translation with radial clearance.

Flanges 46 and 48 at their peripheries include respectively seals bearing on the sleeve 68, such seals which assure in part sealing of chambers 70 and 72 being of the same type as those previously described and bearing the common reference 66.

Here it will be specified that piston 36 formed from the two flanges 46 and 48 is held fixed against rotation within cavity 68, that is to say, relative to cylinder 38 thanks to the pneumatic pressures generated in the two chambers 70 and 72 and thanks to friction of the peripheral seal 66 of the two flanges 46 and 48 within sleeve 68.

At the same time, cylinder 38 may slide and be translated along axis AR under the effect of the air pressure generated either in chamber 70 or in chamber 72. Additionally, the closing mechanism MF can slide and be translated along the same axis with cylinder 38 since such closing mechanism MF is coupled to cylinder 38 and is thus coupled to the control means MP through the first rotational guidance means formed by the first rotation bearing 32.

As to piston 36, this is maintained fixed against translation since it is fixed to the second rotation bearing 52 which is blocked on body 3, itself screwed onto the headstock 2. Such piston 36 is at the same time freely mounted for rotation relative to body 1 and relative to jaws MS through the second rotation bearing 50.

The control means MP, thanks to the two bearings 32 and 52, are freely mounted for rotation relative to the closing mechanism MF which itself is wholly subject to the rotational movement of jaws MS because of the lateral coupling between runners 24 and slots 22 and the radial coupling of such runners 24 and the ramps R of jaws MS.

Operation of this arrangement is as follows.

To begin machining, that is to say, at the time of introduction of a bar material B from the end E1, arrangement D is maintained in the position shown on FIG. 1. Duct 76 is connected to the exhaust while air under pressure is brought into duct 74 and generates a pneumatic pressure in the pushing chamber 70. Cylinder 38 is thus maintained in its advanced position and retains the closing mechanism MF in the corresponding forward position, namely the pressure ring 20 and runners 24 which are in the pushed state. Runners 24 rest respectively on the forward section 16 of ramps R without stressing them. Jaws MS are retained in their open position at a certain distance from bar B solely owing to the action of the return means MR formed by the spring wire 14.

When bar B has been completely introduced into arrangement D and projects sufficiently to the exterior thereof, bar B is clamped as shown on FIG. 2.

As is seen on this figure, cylinder 38 is drawn to the rear by connecting duct 74 to the exhaust and by increase of the air pressure in the pulling chamber 72, which pressure is applied through duct 76. Thenceforth, the closing mechanism MF, thus the pressure ring 20 and runners 24 are drawn rearwardly. Runners 24 roll on the corresponding ramps 18 and stress jaws MS which are radially displaced towards and against the bar B of material.

The very slight slope of the rear section 18 of ramp R on which the runners 24 roll enables multiplying the radial thrust force on jaws MS relative to the axial traction force furnished by the control means MP. It is thus understood that the closing mechanism MF further forms a multiplication means between the control force and the force on the jaws, thus on bar B.

Additionally, thanks to such slight slope of ramps R, this arrangement appears to be self-locking since in the closed position of the jaws such as described and seen on FIG. 2, runners 24 remain stable in position on jaws MS. The operating pressure in chamber 72 may thus be released and the bearing 32 may be freed from its axial stress.

Furthermore, it will be noted that the slope of ramps R is such that they are oriented along a negative slope, that is to say, towards bar B in the forward sense of the arrangement and thus towards a machined region of bar B here shown in a very sketchy manner by dashed lines RU. Such slope assures that the cutting efforts during machining of bar B are oriented along axis AR in a same sense as the clamping forces (axial component) on bar B which improves precision of the clamping.

At the end of the machining operation, in order to bring about advance of bar B, the jaws MS are released by increasing the air pressure in the pushing chamber 70 and connecting the pulling chamber 72 to the exhaust which pushes cylinder 38 and the closing mechanism MF (ring 20 and runners 24) forwardly. The runners return onto the forward section 16 of ramps R and free jaws MS.

Thus, in the absence of the closing force provided by the closing mechanism MF and given that jaws MS are urged towards their opening position basically by the return means MR (through the spring-wire 14), in particular when the spindle has stopped, they separate from bar B and release it.

In the case where opening is brought about during rotation of the spindle, release is improved through the action of the centrifugal force which tends to spread jaws MS towards the exterior.

Figure 5:
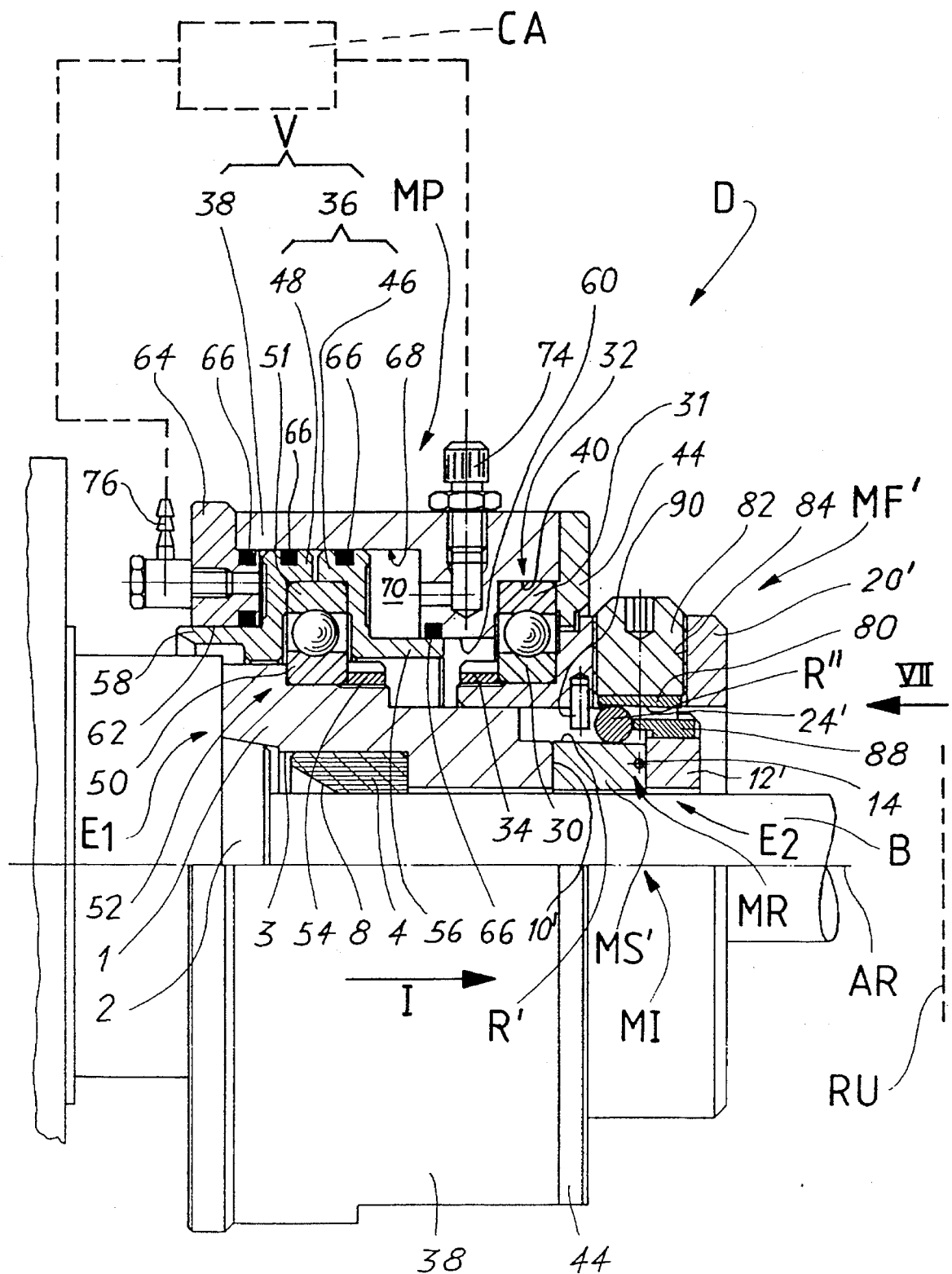
FIGS. 5 and 6 show a half cut-away longitudinal elevation of a clamping arrangement according to a second embodiment of the invention, respectively in the released and clamped positions of a bar of material.
Figure 6:
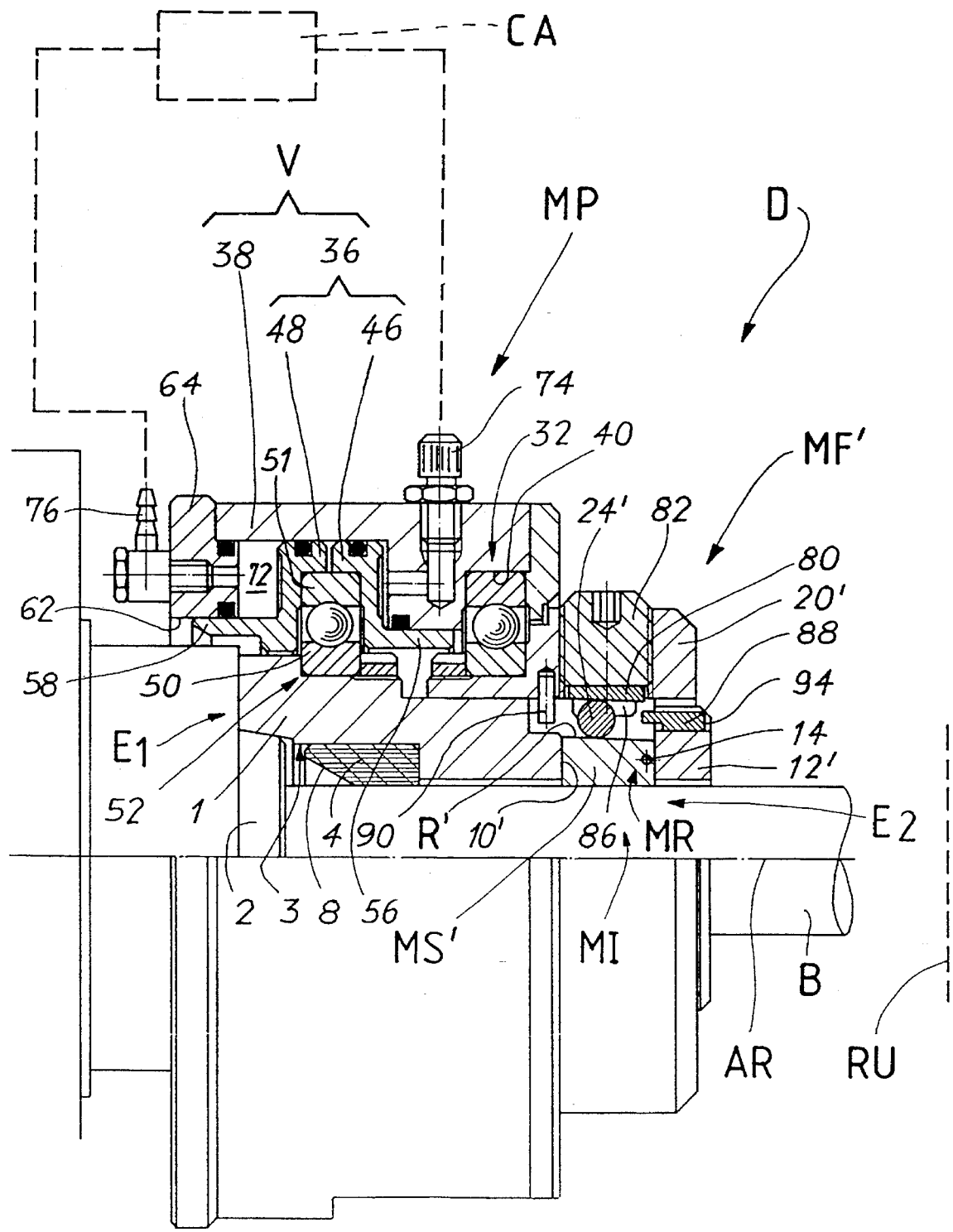
Figure 7:
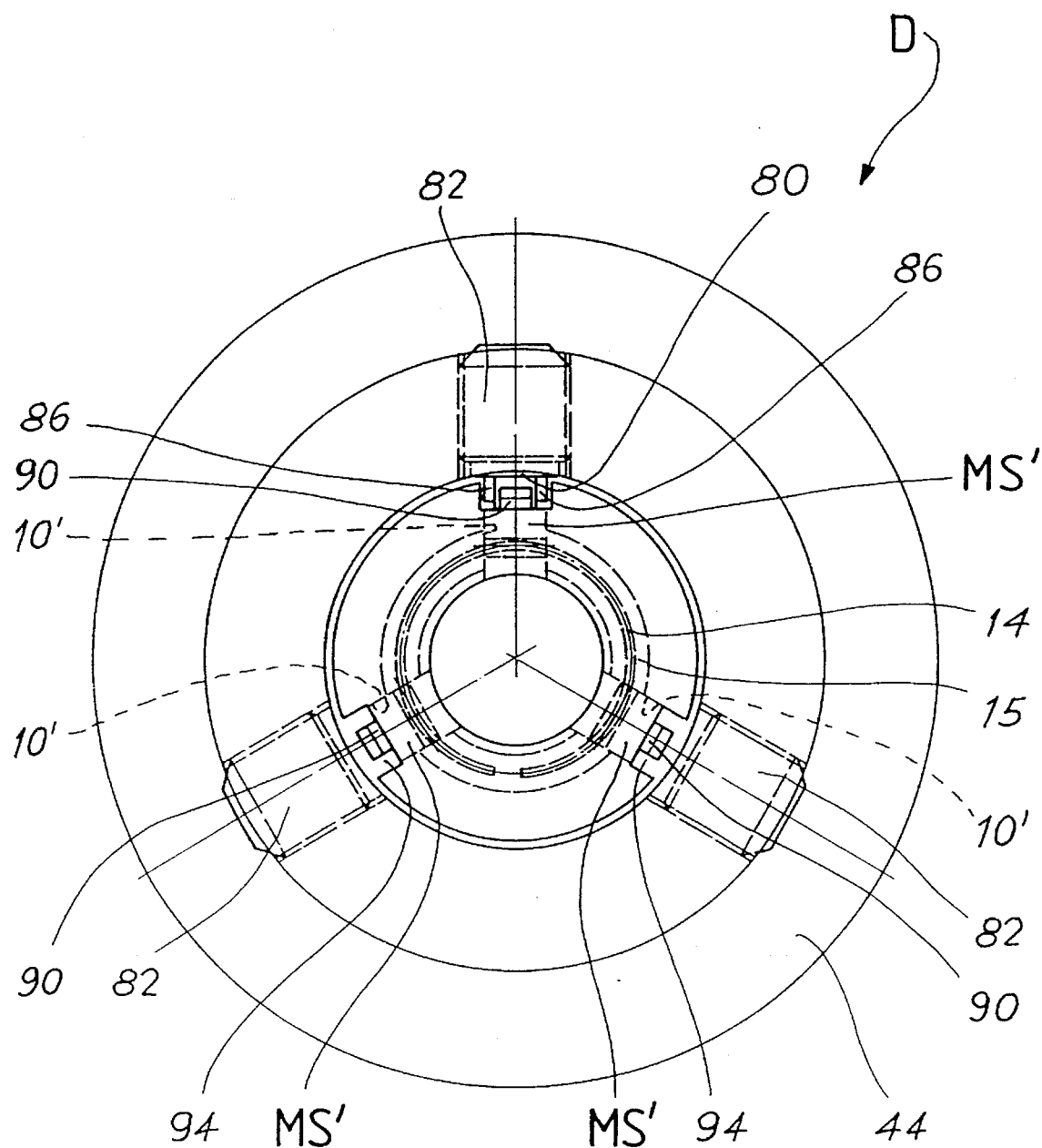
FIG. 7 is a face view of the arrangement of FIGS. 5 and 6 taken along arrow VII of FIG. 5.

Referring now to FIGS. 5 to 7, there will be described hereinafter the second embodiment of the arrangement according to the invention.

On these figures, parts similar to those of the arrangement of the first embodiment previously described bear the same references.

Hereinafter, there will be described only the main differences which exist between the first and second embodiments. Such differences basically concern a closing mechanism MF' and on the form of the ramps of a jaw assembly MS'.

In this second embodiment the coupled tubular runners 24 are replaced by full rollers 24' which are interposed and compressed between a pressure ring 20' and ramps R' of jaws MS'.

More specifically, ring 20' of the closing mechanism MF' includes bearing elements 80 respectively made up by wedges (same reference) which may be adjusted in a radial position relative to bar B by screw-nut systems including screws 82 respectively engaged in open radial threaded bores 84 provided directly in the pressure ring 20'.

Each wedge 80 includes a ramp R" facing the jaw which is associated therewith and oriented parallel to the corresponding ramp R' and thus of the same slope as the latter.

Wedges 80 are housed freely, at least in part, in ring 20', respectively under screws 82 and they exhibit lateral wings 86 on either side of their ramp R". The lateral wings 86 are intended to guide the displacement of the full rollers 24' between their respective ramps RR' and R" during the forward and rear movements of the closing mechanism MF'.

It will furthermore be noted that rollers 24' in being of an essentially solid structure here do not cooperate with any support axis since they are enclosed and caged in, on the one hand, laterally between wings 86 and on the other hand radially between wedges 80 and jaws MS'. They thus undergo only the compression forces oriented in a substantially radial manner relative to arrangement D but with no sheer force. Their resistance to stresses during closing of the jaws MS' is thus very high.

The closing mechanism MF' according to this second embodiment furthermore includes abutments 88, referred to as forward abutments, intended to limit the axial displacement (rolling) of the full rollers 24' on their respective two ramps R' and R" towards the front during opening, such abutments 88 being thus intended to assure return of the rollers 24' into an initial position on the corresponding jaws during opening of the jaws. One thus obtains an initialization of the axial position of the rollers at each opening of the arrangement D in the latter.

This mechanism further includes abutments 90 referred to as rear abutments, also limiting the axial displacement (rolling) of rollers 24' on their two respective ramps R and R", but this time during closing of the jaws, that is to say, during the rearward displacement of the mechanism MF'.

The forward abutments 88 are made up by studs (same reference) fixedly assembled, for example by screws not shown, in axial open grooves 94 (FIGS. 6 and 7) provided on the periphery of an annular plate 12'. Abutments 88 project into slots 10' in which are housed jaws MS'.

The rear abutments 90 are made up by pins (same reference) force fitted into ring 20' and respectively projecting towards the interior of the arrangement into slots 10'.

In order to enable such assembly, slots 10' extend axially rearwards in body 1 in order to receive pins 90. It will be noted that rollers 24' and the guiding wings 86 are wholly housed in such slots 10'.

The operation of the arrangement according to this second embodiment is similar to that of the previous embodiment, except that during opening and closing movements of the mechanism MF', rollers 24', in being displaced by the coupled portion (ring 20') of mechanism MF, roll under ring 20' and are not directly drawn by the latter as is the case in the first embodiment.

What I claim is:

1. A chuck for selectively clamping a bar of material for rotational movement about an axis, comprising:

clamping means including movable jaws mounted for radial translational movement relative to the bar of material, such jaws being capable of occupying either closed or open radial positions in order, respectively, to clamp or release said bar, a mechanism for moving said jaws towards their closed position with sufficient force to clamp said bar, retaining means for maintaining said jaws in their open position in the absence of the force provided by said mechanism, and, control means for controlling the operation of the mechanism, by causing a translational motion of said mechanism relative to said clamping means in a direction substantially parallel to said axis, said mechanism including a first axially sloping ramp disposed on each of said jaws, bearing elements respectively opposing each of said jaws, each including a second axially sloping ramp facing said first ramp of the opposing jaw, and solid round members for each of said jaws rotatably interposed between said facing first and second ramps and cooperating with and rolling on said facing first and second ramps for driving said jaws towards their closed position for clamping the bar when said mechanism is actuated by said control means.

2. A chuck as set forth in claim 1 wherein the control means includes a pneumatically controlled thrustor having a piston and a cylinder, said piston being mounted for free rotation relative to said jaws and including a rotation bearing and two end flanges mounted on either side of said rotation bearing.

3. A chuck as set forth in claim 2 wherein said rotation bearing has an outer race and wherein said flanges are freely engaged on said outer race.

4. A chuck as set forth in claim 1 wherein said first and second ramps respectively of the jaws and the opposing bearing elements are oriented parallel to one another and increase in height in the same direction.

5. A chuck as set forth in claim 1 wherein the mechanism includes abutments for limiting the axial displacement of the round members on their first ramps and for assuring return of such round members to an initial position.

6. A chuck as set forth in claim 1 wherein the first and second facing ramps are inclined with a negative slope towards the bar of material in the direction of a machined region of such bar.

7. A chuck as set forth in claim 1 wherein said jaws have interior faces for engaging the bar and outer faces situated radially opposite said interior faces, said round members resting on and rolling on said outer faces on which said first ramps are arranged.

8. A chuck as set forth in claim 4 further including adjustment means for adjusting the radial position of said bearing elements relative to the bar.

9. A chuck as set forth in claim 8 wherein said adjustment means comprise a screw-nut system.

10. A chuck as set forth in claim 4 wherein said mechanism includes a pressure ring surrounding said jaws and wherein said bearing elements are housed in said pressure ring.

11. A chuck as set forth in claim 4 wherein said bearing elements comprise wedges on which said second ramps are arranged.

12. A chuck as set forth in claim 11 wherein said wedges are housed freely in said pressure ring.

13. A chuck as set forth in claim 11 wherein each of said wedges has lateral wings on either side of its second ramp for guiding the displacement of the rollers between their respective facing first and second ramps.

* * * * *